United States Patent [19]

Strack

[11] 3,933,556
[45] Jan. 20, 1976

[54] FIBER OPTIC IMAGE SHAPE CONVERTER AND METHOD OF MAKING THE SAME

[75] Inventor: Richard R. Strack, Southbridge, Mass.

[73] Assignee: American Optical Corporation, Southbridge, Mass.

[22] Filed: Jan. 10, 1974

[21] Appl. No.: 432,274

[52] U.S. Cl............... 156/155; 65/4 B; 65/DIG. 7; 156/180; 156/296; 350/96 B
[51] Int. Cl.² .................... B32B 17/04; G02B 5/14
[58] Field of Search .......... 156/180, 296, 167, 168, 156/173, 175, 169, 441, 155, 174; 65/4, 31, DIG. 7; 350/96 B

[56] References Cited
UNITED STATES PATENTS

| | | | |
|---|---|---|---|
| 3,191,487 | 6/1965 | Kruythoff et al................ | 350/96 B |
| 3,205,738 | 9/1965 | Ballmer et al.................. | 350/96 B |
| 3,236,710 | 2/1966 | Curtiss............................. | 156/175 |
| 3,580,775 | 5/1971 | Siegmund......................... | 156/296 |
| 3,653,739 | 4/1972 | Strack.............................. | 65/4 |
| 3,717,531 | 2/1973 | Smith............................... | 156/180 |
| 3,830,667 | 8/1974 | Carpenter........................ | 156/180 |

Primary Examiner—William A. Powell
Assistant Examiner—Michael W. Ball
Attorney, Agent, or Firm—H. R. Berkenstock, Jr.; William C. Nealon

[57] ABSTRACT

A fiber optic image transporting device for converting the shape of optical images directed thereinto. The device is formed of an initially rigid multifiber conduit having a leachable fiber connecting matrix. The matrix is removed from one end of the conduit and replaced with a fiber bonding resin. The intermediate portion of the conduit is then leached, keeping its opposite end intact as one image transmitting face of the device, and the resin bonded end is cut into sections of predetermined shapes and sizes which are reassembled to form a differently shaped second image transmitting face.

7 Claims, 10 Drawing Figures

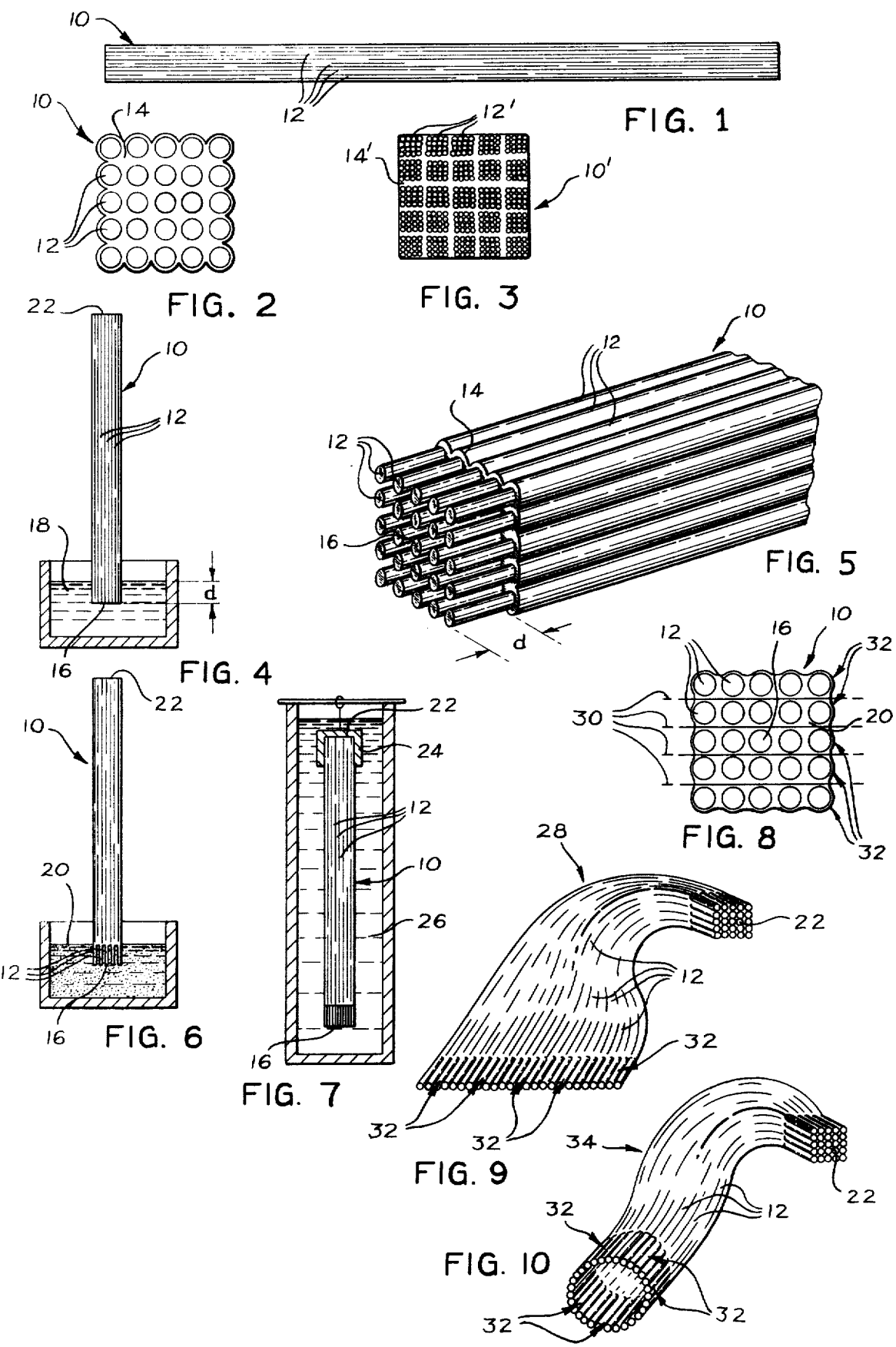

FIBER OPTIC IMAGE SHAPE CONVERTER AND METHOD OF MAKING THE SAME

BACKGROUND OF THE INVENTION

1. Field of the Invention

Fiber optic image transporting devices with particular reference to image shape converters and method of making the same.

2. Description of the Prior Art

Prior art devices for converting images from one shape to another, e.g. from a rectangular raster to a line or circle and vice versa, have been extremely difficult, time consuming and expensive to manufacture.

Previous methods of making fiber optic image shape converters involved the handling of great numbers of usually very fine fibers in special aligning, bundling and cementing operations. A common procedure was to form a multiplicity of ribbons of parallel fibers and handpack these ribbons one upon another into a desired raster configuration at one end of the array. Corresponding opposite ends of the ribbons were then manually lined up side by side or into a circular or other configuration.

In addition to ordinary problems of fiber breakage in the handling of fiber ribbons per se, prior art difficulties in making the ribbons without such imperfections as fiber breakage, fiber overlapping and/or excessive spacing between fibers have seriously limited the availability of fiber optic image shape converting devices. Furthermore, those commercially available or otherwise obtainable have been unduly expensive and generally of inferior fiber optic quality.

An aim of the present invention is to improve the image resolving and transmitting capabilities of fiber optic image shape converters and to provide a process for manufacturing these devices which is adaptable to large or small production runs and requires, in either case, only a minimum of time, expense and skill to implement while offering an assurance of repeated duplication of the improved end product result.

SUMMARY OF THE INVENTION

The aforementioned objectives and their corollaries are accomplished by a novel technique of using intially rigid but leachable multifiber conduit as the basic structure of an image shape converter to be formed according to the invention.

A preselected length of leachable image conducting conduit (i.e. a multiple fiber conduit having a leachable fiber connecting matrix) is leached at one end to remove the connecting matrix. The removed matrix is replaced with a fiber bonding resin and, keeping the opposite end of the conduit intact as one image transmitting face of the device, its intermediate portion is leached so as to free its fibers and render the device intermediately flexible. The resin bonded end is then cut longitudinally (i.e. through the bonding resin) into sections of predetermined shapes which are reassembled into the form of a differently shaped second image transmitting face of the device.

The details of the invention will be better understood by reference to the following description taken in conjunction with the accompanying drawings.

IN THE DRAWINGS

FIG. 1 is a side elevational view of a leachable multiple fiber conduit which is exemplary of the type of structure from which image shape converting devices may be formed according to the present invention;

FIG. 2 is an end view of the conduit of FIG. 1;

FIG. 3 is an end view of a modified form of leachable conduit useful in the practice of the invention;

FIG. 4 is a diagrammatic illustration of an initial step in the process of forming image shape converting devices according to the invention;

FIG. 5 is an enlarged fragmentary perspective view of a multiple fiber conduit depicting the result of the process step of FIG. 4;

FIGS. 6, 7, and 8 are diagrammatic illustrations of additional steps of the process of the invention; and FIGS. 9 and 10 are illustrations, in perspective, of exemplary forms of image converting devices which may be produced according to the invention.

DESCRIPTION OF THE PREFERRED EMBODIMENTS

According to the present invention, image shape converting devices of the types shown in FIGS. 9 and 10, for example, are each formed of an initially rigid section of fused leachable multiple fiber conduit such as conduit 10 of FIGS. 1 and 2.

Conduit 10 comprises an asembly of juxtapositoned optical fibers 12 fused together in a predetermined orderly array with an interconnecting matrix 14 of a leachable glass or metallic bonding material. Conduit 10 may be similar to any one or another of the types shown, described and/or capable of being produced according to U.S. Pat. Nos. 3,004,368 and 3,624,816.

Fibers 12 of conduit 10 are preferably glass-clad monofilaments each surrounded by the leachable material of matrix 14. It is to be understood, however, that fibers 12 may, alternatively, each comprise a multiplicity of bundled together monofilaments, as multifibers 12' (FIG. 3), all interconnected with a leachable matrix 14'. A further modification of conduit 10 (not illustrated) may include a leachable matrix material surrounding each of the monofilaments of multifibers 12' in addition to the matrix 14' of FIG. 3.

In all cases, the monofilaments 12 and the individual fiber elements of multifibers 12' preferably each comprise a glass core of high refractive index (e.g. in the range of from 1.5 to 1.81) surrounded by a relatively thin cladding of relatively low refractive index material (e.g. in the range of from 1.48 to 1.52). The monofilaments 12 or multifibers 12' may be arranged in any geometrical pattern desired which is carried through the length of the conduit 10 or 10'. A desirable arrangement is depicted in FIGS. 2 and 3 wherein the fibers 12 and 12' respectively are juxtapositioned in straight rows and accurately superimposed. Corresponding fibers of each row are aligned in directions perpendicularly to the rows.

For ease and clarity of illustration, conduit 10 has been depicted as comprising an array of 25 relatively large fibers 12 (FIG. 2) or 12' (FIG. 3). It should be understood that in actual practice, a conduit consisting of considerably more and smaller diameter fibers 12 or multifibers 12' would normally be used.

Details concerning materials used in fabricating fibers 12, 12' and matrices 14, 14' useful in the manufacture of conduit 10 will not be outlined herein. Those interested in such details may refer to the aforementioned exemplary U.S. Pat. Nos. 3,004,368 and 3,624,816.

Referring more particularly to FIGS. 4–8, the process of the invention using conduit 10 of FIGS. 1 and 2 for illustration, is as follows:

One end 16 of conduit 10 is placed in a leaching solution 18 (e.g. hydrochloric acid or sodium hydroxide) to remove its fiber connecting matrix 14 over a short distance back from end 16 as illustrated in FIG. 5.

In the more usual case of working with conduit of from approximately ½ to ¾ inch square and individual fiber 12 diameters in the order of 0.003 inch, this removal of matrix 14 is effected over a distance d (FIGS. 4 and 5) of from 1/16 inch to approximately ⅛ inch back from end 16. The removal of greater or lesser amounts of matrix material in this step of the process may be desirable in cases where conduit 10 is of respectively larger or smaller cross-sectional size.

The distance d is, nevertheless, preferably limited in its extent to an amount less than that which would render the freed portions of fibers 12 sufficiently flexible to become subject to appreciable geometrical misplacement from their initial patterning in conduit 10. With the aim of preserving the initial geometrical patterning of fibers 12 after leaching, distance d is held shorter for small diameter fibers 12 and vice versa.

The matrix material 14 removed from fibers 12 at end 16 of conduit 10 is next replaced with an epoxy resin or an equivalent acid-resistant bonding material which, when cured, can be readily severed with a sharp knife or razor blade. This is accomplished preferably by dipping the leached end 16 of conduit 10 into a supply 20 of the bonding material as illustrated in FIG. 6. Material 20 may be a B-stage epoxy of the type described in U.S. Pat. No. 3,729,356, for example, or any adhesive material having an equivalent workability and utility in the present process.

Once in place, the epoxy is dried at room temperature and cured with heat. The latter may be effected at a later stage of the process if desired. For example, drying of the epoxy to a non-flowable cement-like consistency will suffice for completion of the yet to be described method steps of FIGS. 7 and 8. Actual curing (polymerization) of the epoxy can be effected after formation of the particular image-shape converting device of FIG. 9 or FIG. 10.

It is to be understood that other liquid adhesives, waxes or cements of the single stage drying and/or curing type may be substituted for the multiple stage epoxy, if desired. They must, however, be resistant to leaching acids or hydroxides and the like.

Having replaced the matrix 14 removed from end 16 of conduit 10 with bonding material 20 according to FIG. 6, the opposite end of conduit 10 is capped with an acid-resistant covering 24 (e.g. wax) and the whole unit is suspended or otherwise immersed in a leaching solution 26 preferably of the same type as solution 18, is similar thereto.

With the bundle of fibers 12 held intact at ends 16 and 22 of conduit 10 by bonding material 30 and protective covering 24, the conduit is kept within the leaching solution 26 until the matrix 14 is substantially completely removed from its remaining intermediate section thereby freeing the fibers 12. Being so rendered intermediately flexible, conduit 10 is removed from solution 26 and cleansed.

It should be understood that, following each leaching step of this invention, conduit 10 is preferably cleansed of the leaching medium to prevent unnecessary erosion of fibers 12. Typical cleansing operations are described in the aforementioned U.S. Pat. Nos. 3,004,368 and 3,624,816.

Finally, end 16 of conduit 10 is cut into sections of desired shapes and sizes which are reassembled into geometrical configurations differing from the fixed rectangular raster-shape of end 22. In this regard, a raster-to-line shape converter 28 (FIG. 9) may be produced by cutting end 16 of conduit 10 through bonding material 20 parallel to fibers 12 along lines 30. Having thus separated the superimposed rows 32 of fibers 12, they may be repositioned in aligned edge-to-edge relationship as shown in FIG. 9. Had a two-stage bonding material 20 been used and left unpolymerized up to this point, the aligned section 32 could be heat joined and cured, e.g. at temperatures of 250°F or thereabout. Alternatively, other edge joining adhesives or mechanical clamps may be used to maintain the integrity of the aligned sections 32.

Another form of image-shape converter, i.e. a raster-to-circle converter 34 is illustrated in FIG. 10. This may be produced by cupping sections 32 and joining them together in a circular array.

In each of image-shape converters 28 and 30, an optical image formed upon their rectangular rasters at ends 22 will be transferred mosaically through fibers 12 by the well-known principles of total internal reflection and converted into a different shape upon emission. Converter 28 (FIG. 9) will emit a long and slender or line-like image and converter 34 will emit a circular or ring-like image. It should also be understood that a line-like optical image or pattern of light directed into sections 32 of converter 28 will be converted to a solid rectangular optical image or pattern of light at end 22 thereof. Similarly, a circular optical image or pattern of light directed into sections 32 of converter 34 (FIG. 10) will be converted into a solid rectangular image or pattern of light at its end 22.

End 16 of conduit 10 may alternatively be cut along lines perpendicular to lines 30 between fibers 12 or both along lines 30 and perpendicular thereto. The latter may be used to form blocks of fibers 12 for reassembly into a different than the original pattern thereof. In reassembly, the cut end 16 may be formed to the configuration of a triangle, cross, or other desired configuration.

From the foregoing description, of the invention, it can be seen that prior art problems of excessive fiber breakage, improper alignment, poor bundling fraction, undue costliness and general product inferiority have been overcome and that the present process is readily adaptable to either large or small scale production requiring a minimum of time, expense and skill to implement.

I claim:

1. The method of making a fused glass clad glass image transporting and shape converting device from a section of fused glass optical fiber conduit having a multiplicity of juxtapositioned individually flexible light-conducting fibers all rigidly fused together with a leachable glass matrix and said fibers being substantially indentically geometrically patterned at least at opposite ends of said conduit wherein said method comprises the steps of:

leaching said glass matrix away from said fibers adjacent a first end of said conduit;
replacing said leached matrix with a non-leachable bonding material;

covering the opposite second end of said conduit with a protective cap of non-leachable material to protect the fused glass clad glass integrity thereof;

leaching said matrix away from said fibers throughout the extent of said conduit between said non-leachable bonding material and said cap to render said fibers of said conduit and said conduit as a whole intermediately flexible;

separating said fibers into a plurality of groups at said first end of said conduit each group being of a preselected size and shape by cutting between said fibers longitudinally thereof through said non-leachable bonding material;

assembling said groups of fibers into a predetermined pattern differing in geometrical configuration from that of said first end of said conduit; and removing said cap at any preselected stage of said method following said last mentioned leaching step.

2. The method of making an image transporting and shape converting device according to claim 1 wherein said leaching steps are performed by placing corresponding sections of said conduit in a leaching solution and said step of replacing said leached matrix with a non-leachable bonding material is performed by dipping said one end of said conduit into said bonding material.

3. The method of making an image transporting and shape converting device according to claim 1 wherein said non-leachable bonding material is a two-stage epoxy which must be dried following its application and said method further includes the step of applying heat to said epoxy for polymerization thereof at a preselected stage of the method subsequent to drying of the epoxy.

4. The method of making an image transporting and shape converting device according to claim 1 wherein said groups of fibers each comprise a row thereof and said rows are reassembled in edge-to-edge relationship into said pattern of differing geometrical configuration.

5. The method according to claim 4 wherein said pattern is line-like in configuration.

6. The method according to claim 4 wherein said pattern is ring-like in configuration.

7. The method of making an image transporting and shape converting device according to claim 1 wherein said reassembled groups of fibers are secured together as a unit.

* * * * *